(12) United States Patent
Mehta et al.

(10) Patent No.: US 7,706,283 B2
(45) Date of Patent: Apr. 27, 2010

(54) DECENTRALIZED AND DYNAMIC ROUTE SELECTION IN COOPERATIVE RELAY NETWORKS

(75) Inventors: Neelesh B. Mehta, Needham, MA (US); Ritesh Madan, Somerset, NJ (US); Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 695 days.

(21) Appl. No.: 11/527,267

(22) Filed: Sep. 25, 2006

(65) Prior Publication Data

US 2008/0075007 A1 Mar. 27, 2008

(51) Int. Cl.
*H04L 12/26* (2006.01)
(52) U.S. Cl. ...................... 370/238; 455/424
(58) Field of Classification Search .......... None
See application file for complete search history.

(56) References Cited

U.S. PATENT DOCUMENTS

2005/0014464 A1* 1/2005 Larsson .................. 455/11.1
2008/0125109 A1* 5/2008 Larsson et al. .............. 455/424

OTHER PUBLICATIONS

R. Madan, N. B. Mehta, A. F. Molisch, and J. Zhang, "Energy efficient cooperative relaying over fading channels with simple relay selection," Globecom 2006.

A. Wittneben, I. Hammerstroem, and M. Kuhn, "Joint cooperative diversity and scheduling in low mobility wireless networks," IEEE Global Telecommunications Conference (Globecom), vol. 2, pp. 780-784, 2004.

* cited by examiner

*Primary Examiner*—Phuc Tran
(74) *Attorney, Agent, or Firm*—Dirk Brinkman; Gene Vinokur

(57) ABSTRACT

A method selects an optimal route in a cooperative relay network including a set of nodes. For each node in a set of nodes of a cooperative relay network, dynamically varying channel state information is determined. A transmission policy based on the dynamically varying channel state information is selected, in which the transmission policy includes selected nodes forming an optimal route, a transmission mode for each selected node, and a transmission power for each selected node.

18 Claims, 6 Drawing Sheets

100

300

200

DECENTRALIZED AND DYNAMIC ROUTE SELECTION IN COOPERATIVE RELAY NETWORKS

FIELD OF THE INVENTION

This invention relates generally to cooperative relay networks, and more particularly to selecting a route in such a cooperative relay network in a decentralized and dynamic manner.

BACKGROUND OF THE INVENTION

In cooperative relays networks, nodes cooperate with each other while transmitting packets. Cooperative networks can provide significant gains in overall throughput and energy efficiency. Using nodes with single antennas, cooperative communication exploits, in a distributed manner, an inherent spatial diversity in the network, which has different channels between different nodes. This minimizes the effects of fading, and at the same time reduces energy consumption of the network.

Cooperative strategies for relay networks with simple two-hop or three-hop topologies are described by R. Madan, N. B. Mehta, A. F. Molisch, and J. Zhang, "Energy efficient cooperative relaying over fading channels with simple relay selection," Globecom 2006.

However, many cooperative relay networks have tens or even hundreds of nodes. In such networks, the topology is arbitrary. The network includes numerous decode-and-forward (relay) nodes that are powered by batteries. Therefore, energy efficiency is of critical importance.

At the same time, despite the presence of fading, the outage probability on a route from a source node to a destination node must be kept below a specified level to ensure reliability.

A key problem in cooperative networks with many nodes is finding an optimum route. This problem is significantly different from the traditional routing problem for networks. In traditional, non-cooperative routing, a packet is transmitted serially from the source node to the destination node, via a sequence of relay nodes that form a single route. Each relay node communicates only with two other nodes, i.e., the previous node and the next nodes along the route. Traditional networks do not transfer a packet along two different routes to a destination.

In cooperative routing, a set of relay nodes can cooperate to forward a packet in parallel along multiple routes. This requires that nodes communicate with more than two nodes, either multiple previous nodes or multiple next nodes. Each transmission along a cooperative route can be a broadcast from one previous node to multiple next nodes, or a cooperative transmission from multiple previous nodes relay nodes to a single next node using beamforming. Beamforming controls the phase and power of transmitted signals from multiple nodes so that the signals are received coherently at the next nodes.

The general problem of determining cooperative routes in relay networks with arbitrary network topologies is computationally hard. It involves determining which nodes participate in a cooperative route, the cost of acquiring channel state information (CSI), and the respective transmission power costs as a function of CSI, with a goal of minimizing the total energy consumption in the network, while retaining a certain quality of service (outage probability). For quasi-static channels, this general problem is known be NP-hard.

The modes of collaboration depends critically on channel state information (CSI) that is available at the relay nodes. If the relay nodes do not have CSI for the channels on which the relays transmit, collaborative space-time coding can be used to increase the diversity order, and thus reduce sensitivity to fading.

It is also helpful to distinguish between operation in quasi-static and time-varying fast-fading channels. In the quasi-static case, the channels do not change over a relatively long time, and the optimum collaborative route stays optimum for many consecutive packets. Thus, the relative cost for obtaining and communicating the CSI is negligible. For fast-fading channels, on the other hand, the channel gain of the channels can change from one transmission interval to the next. Thus, the CSI may need to be refreshed for each transmitted packet. The significant cost for this process has to be added to the total energy cost. It is desired minimize the cost while finding an optimal route in a cooperative relay network.

For quasi-static channels, the problem of finding an optimal cooperative route, with broadcasting and beamforming nodes, is known to be NP-hard. However, conventional networks generally do not exploit the broadcast nature of the channel after the first transmission, and are provably suboptimal for topologies that have multiple relays available in intermediate hops. While those heuristics can be extended to fast fading channels, a significant amount of CSI is needed at a number of consecutive hops on a route. Obtaining such CSI can entail a significant energy cost and complexity.

Cooperative routing in a network with fast fading channels and using a limited class of routing schemes over a specific network topology is described by A. Wittneben, I. Hammerstroem, and M. Kuhn, "Joint cooperative diversity and scheduling in low mobility wireless networks," IEEE Global Telecommunications Conference (GLOBECOM), vol. 2, pp. 780-784, 2004. There, the cost of acquiring the CSI at the transmitting nodes is not considered. They assume relatively static channels, where the channel coherence time is much longer than the block transmission time. Their heuristics are not decentralized. In summary, they formulated the problem of finding the minimum energy cooperative route for a wireless network under idealized channel and receiver models. In practical applications, their assumptions are unreasonable because channels are anything but ideal.

It is desired to dynamically find optimal routes in a decentralized manner. It also is desired to consider large networks with cooperative routing exploiting various transmission modes.

SUMMARY OF THE INVENTION

The embodiments of the invention provide a system and method for energy-efficient and outage-constrained routing in cooperative relay networks. There, intermediate relay nodes cooperate with each other at the physical layer to forward packets from a source node to a destination node. The cooperative routes exploit transmit diversity and the broadcast nature of the wireless channel to adapt to channel variations such as route loss, shadowing, and fading.

The problem is formulated as a decentralized stochastic control problem, where each node obtains dynamic channel state information (CSI) for a relatively small subset of all channels, and a transmission policy. The energy consumption for acquiring the channel state information is modeled explicitly.

For quasi-static fading channels, where the channel gain of the channels remains relatively constant over time, the problem of finding the optimum cooperative route is known to be NP-hard. The invention solves a class of optimization problems that trade off computational complexity with performance, and that converge to an optimal solution.

For the fast fading channels, where the channel gains of the channels can change dynamically, we use a subset of all cooperative routing schemes that route packets from one relay subset to another.

DETAILED DESCRIPTION OF THE PREFERRED EMBODIMENT

Figure 1A:
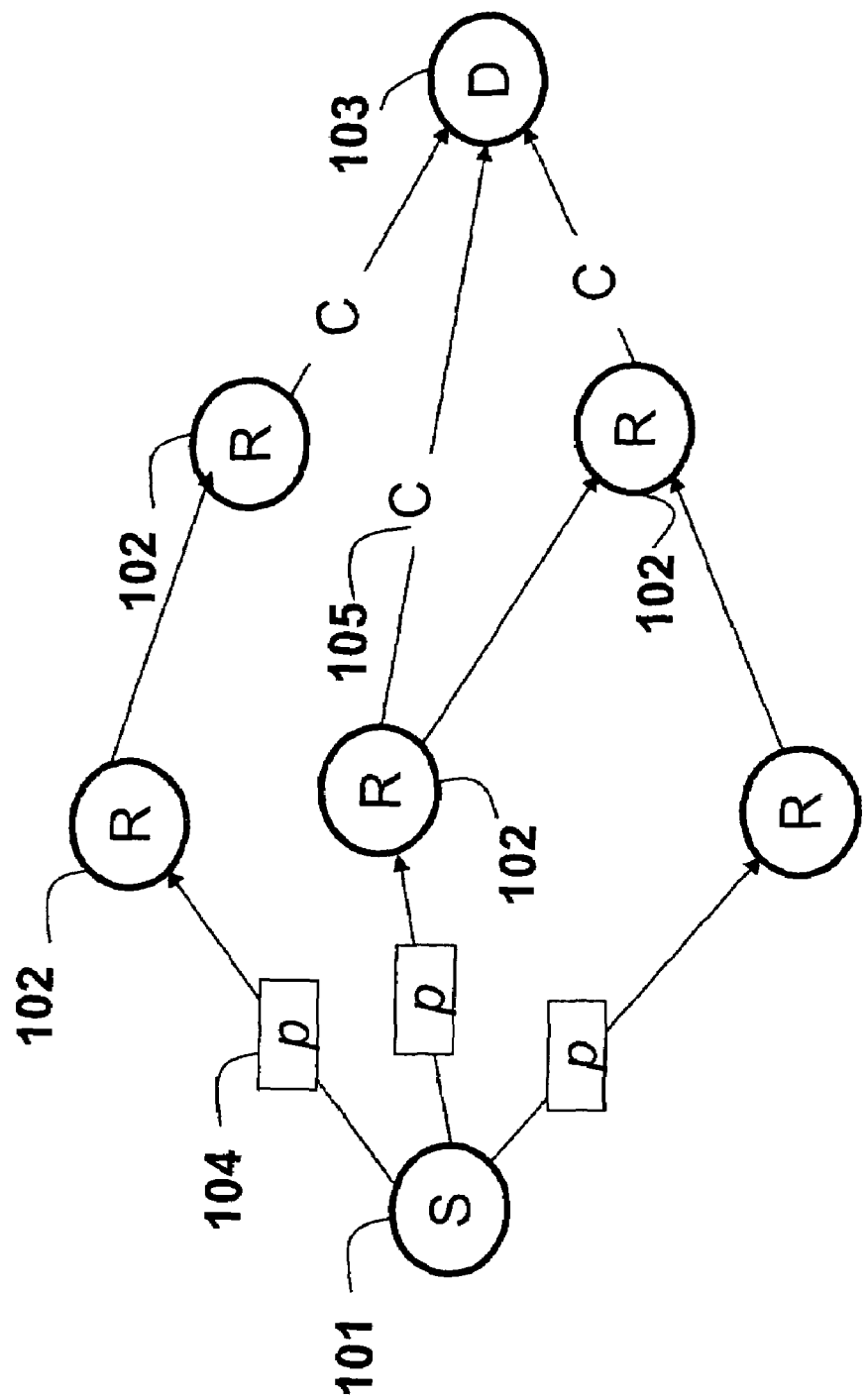
FIG. 1A is a graph representing a cooperative relay network according an embodiment of the invention.

As shown in FIG. 1A, a topology of a cooperative relay network 100 according to an embodiment of the invention can be represented as a graph. Herein, graphs are only used to simplify and clarify the description of the invention. It should be understood that the graph is not an essential component of the invention, and that the invention can be worked without the use of the graphs.

The network 100 includes a source (S) node 101, a set of relay (R) nodes 102, and a destination (D) node 103. The nodes can transmit packets (p) 104 via wireless communication channels (C) 105. In the graph, the channels are represented as links or 'edges' between the nodes. As used herein, the transmission can be one of two possible modes, a broadcast mode and a beamform mode. It must be understood that this does not limit the possibility of using other transmission modes. For example, cooperative space-time coded transmission may also be used.

The embodiments of the invention provide a system and method for energy-efficient and outage-constrained routing in the cooperative relay network 100, in which the set of intermediate relay nodes 102 cooperate with each other at the physical layer to forward packets from the source node 101 to the destination node 103.

Transmission Modes

During the cooperation as stated above, a single node 102 can operate in several modes. A single node can broadcast a packet to one or more nodes, a single node can receive packets from multiple cooperating nodes that use beamforming, or a single node can transmit directly to another node.

The invention is described for slow (quasi-static) fading and time-varying fast fading (dynamic) channel environments. In a slow fading environment, the channels state information is relatively static over time. This makes it possible to establish a transmission policy for the entire network, which is effective for an extended period of time. In this case, the cost of acquiring the CSI, as a factor of total cost, is negligible. In a fast fading environment, the transmission policy varies dynamically with the dynamically changing CSI, and the cost of acquiring the CSI can be significant.

Cooperative Routing

Figure 1B:
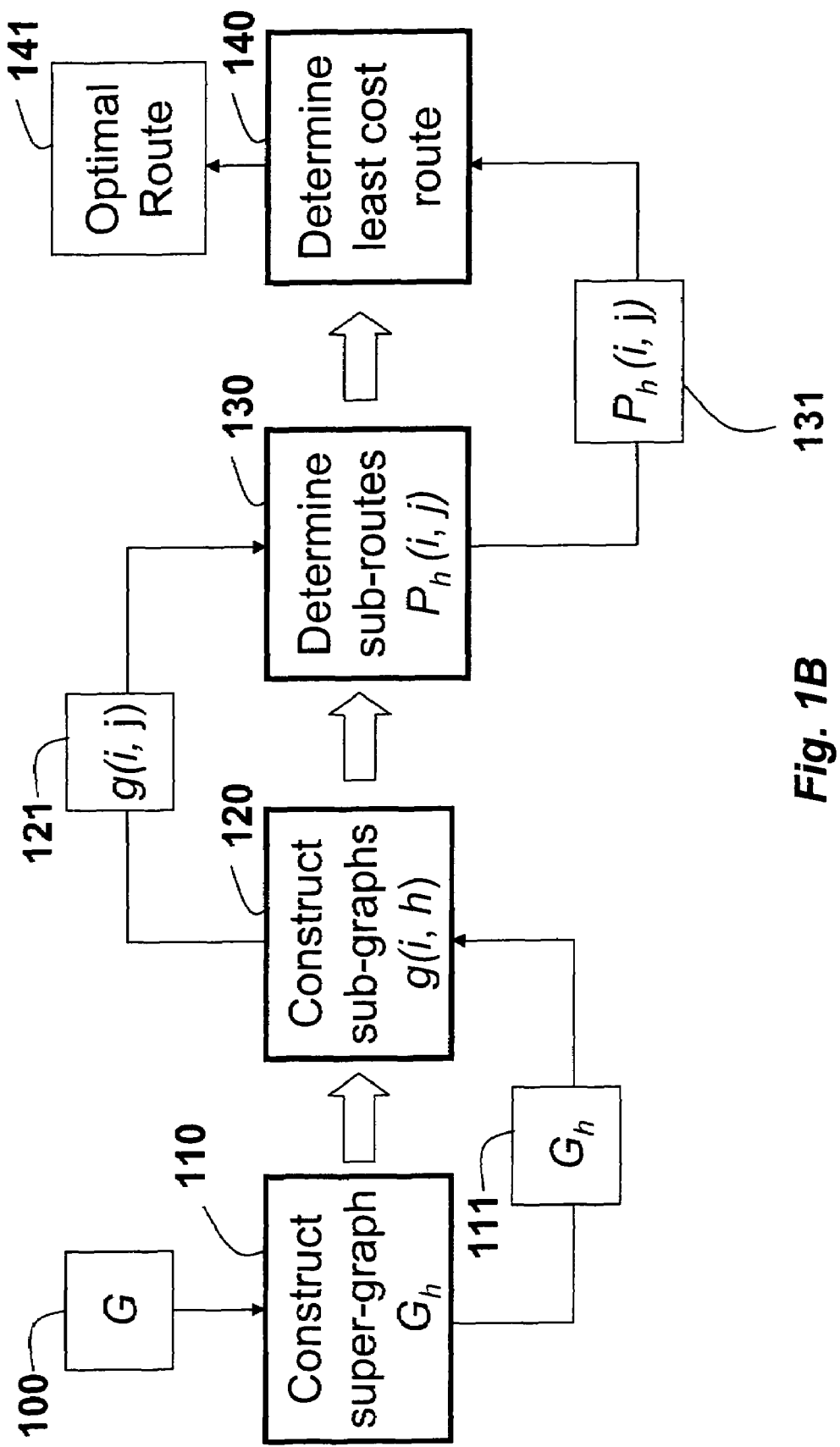
FIG. 1B is a block diagram of a method for selecting an optimal route in a decentralized manner according to an embodiment of the invention.

FIG. 1B is a block diagram of a method for selecting an optimal route from the source to the destination node according to an embodiment of the invention.

We enumerate the possible packet transmission modes, e.g., direct transmission with or without CSI, broadcast with or without CSI, and beamforming with CSI. We also determine a cost for each cooperative route (transmission policy).

Transmission Policies

As defined herein, a transmission policy defines the nodes to be used on a route from the destination to the source, the transmission mode used at each node, and the power used by each node during the transmission. The cost associated with the transmission policy can also include the total energy required to acquire the CSI required by the policy.

Represent Network as a Graph

We start by representing a cooperative network by an undirected graph G 100 of a set of nodes, including the source node (S), the set of relay nodes (R), and the destination node (D). Edges connecting the nodes represent the communication links or channels (C) between adjacent nodes. Hereinafter, an adjacent node is strictly defined as being one hop away. That is, the two nodes are directly connected by a single channel, or a single edge in the graphical representation.

Super-Graph

From the graph G, we construct a super-graph $G_h$. In the super-graph, two nodes are connected by an edge if the nodes are separated by at most h hops in the original graph G. In this case the edge represents a virtual channel between the nodes. The term virtual is used because the edge may represent up to h physical channels.

Nodes connected in this manner are neighboring nodes in the super-graph. For fast fading channels, $h \leq 2$. Generally, the value h depends on a temporal stability of the channel state, i.e., a channel coherence time. If the channel is rapidly varying due to the mobility of nodes, or other reasons, $h \leq 2$. For quasi-static channels $h > 2$. For substantially static channels, h can be relatively large, e.g., all hops along any possible route from the source to the destination.

We can use other scalable criteria for connecting two nodes by an edge in the super-graph $G_h$. For example, instead of using the number of hops h, we can construct a super-graph $G_d$ based on distances d between nodes, or a super-graph $G_\eta$ based on a set of $\eta$ nodes that are closest neighbors of a node in the graph G.

Sub-Graph

For each node i in a subset of nodes V, we construct a sub-graph g(i, h). The vertices V(i, h) in the sub-graph for the node i are the nodes that are within h hops of the node i. Edges E(i, h) in the sub-graph are the edges between the above nodes in the graph G.

Sub-Routes and Costs

For every unique pair of nodes i and j in the subset of nodes V off the sub-graph g(i, h), we determine an optimal cooperative sub-route $P_h(i, j)$ to forward a packet from node i to a node j in the subset of nodes V. We also determine a corresponding least cost, $C_h(i, j)$ for the forwarding the packet along the optimal sub-route P(i, j). The cost is assigned to the edge E(i, j) connecting the nodes in the sub-graph g(i, h). The cost can be determined by dynamic programming or any other known means.

As used herein, the least cost can generally consider and include the cost associated with the transmitters, as well as with the receivers, for example, the energy consumed to forward a packet, the energy consumed to acquire channel state information (CSI), and can depend on the outage and delay constraints. The cost at a receiver can depend on the modulation technique used. It should be noted that the least costs do not need to be absolute minimums. The least costs can be an approximation or an estimation of the minimal costs.

Least Cost Route

Using the sub-routes of the sub-graphs g(i, h), we determine a least cost (or shortest distance) route between the source node and the destination node. Available techniques can include the Dijkstra algorithm, the Bellman-Ford algorithm, the Floyd-Warshall algorithm, the Johnson's algorithm, or other similar known techniques, see below.

Least Cost Algorithm

Initialization

In a least cost algorithm, each node maintains a list of costs to forward a packet to all other nodes in the network. During initialization, the costs can be set to infinity if unknown.

Least Cost Update

During each iteration of the algorithm, a node i updates the "current" cost to forward a packet to node j as follows. Node i obtains the costs to reach node j from its neighbors in the super-graph $G_h$. If the sum of the costs from node i to a neighboring node k and for node k to node j is less than the current cost from node i to node j, then the current cost is updated with the smaller cost. Otherwise, the cost remains unchanged.

Cost Determination and Distribution

To determine the cost $C_h(i, j)$, each node i obtains the channel gain to the node j. The channel gain is distributed to neighboring nodes in graph G. The channel gains are forwarded to all neighbors of node i in the super-graph $G_h$. Each node determines the optimal (least cost) sub-route $P_h(i, j)$ to forward a packet to its neighbors in the super-graph $G_h$. The least costs are also distributed to neighboring nodes in the super-graph $G_h$.

Node Reuse

When a packet is forwarded from node i to node j using a cooperative sub-route, the packet can be received by other intermediate nodes. During node reuse, the intermediate nodes can participate in forwarding packets.

Quasi-Static Channels

We describe a sequence of optimization problems to select the least cost (optimal) cooperative route 141. We solve these optimization problems in a decentralized manner. By decentralized, we mean that all of the nodes in the network can cooperatively participate in the selection of the optimal route.

The degree of decentralization varies for the different problems in this sequence. The solutions to this sequence of problems converge to the optimal, but NP hard, solution. Thus, our method provides a systematic way to trade-off computational complexity and decentralization with cost minimization.

Fast Fading Channels

For fast-fading channels, we formulate the problem of selecting the optimal route as a decentralized control problem described by a Markov decision process (MDP). We describe a class of cooperative routing schemes, and consider explicit mechanisms, and their costs, to acquire the required the CSI.

We select, in a scalable and distributed manner, the optimal cooperative route in a sub-class of cooperative routes that forward a packet from one cooperative relay subset to another. We also consider cooperation between different relay subsets due to the relatively high energy cost and complicated coordination mechanisms to acquire the CSI.

System Model

The network 100 includes a set of nodes V 101, 102, 103. The nodes communicate packets 104 using wireless channels 105.

Time is partitioned into frames having a length less than or equal to a coherence time of the wireless channels in the network. Each frame is split into a time of $T_d$ symbol durations for data packets, and a time of $T_c$ symbol durations for exchange of network control packets, including acquisition and distribution of CSI. Hereinafter, the term frame and time t are used interchangeably, as is conventional in the art.

The channel 105 between nodes i and j during frame (time) t has an exponentially distributed power gain $H_{ij}(t)$, with a mean $\hat{H}_{ij}$, which can differ for the various channels. This corresponds to the conventional Rayleigh fading model.

The channel gains are independent ergodic stochastic processes. We denote the corresponding channel matrix in $\Re^{|V| \times |V|}$ by H(t). The sequence of random variables, $H_{ij}(t)$, for t=1, ..., N, has arbitrary higher order statistics. The channels are assumed to be reciprocal.

To determine the costs for a specific channel, we make the following assumptions. All transmissions in the network occur at an instantaneous data rate of r bits/second/Hz using a bandwidth of B Hz. The bandwidth is sufficient so that the transmissions do not interfere significantly with each other. The interference and noise power spectral density is $N_0$.

A packet is transmitted within one frame time t. If the transmission mode is broadcast, the only requirement is that the packet is received at adjacent nodes within the same frame time. For beamforming, the transmitted packets must be received coherently. A received signal can be successfully decoded at a receiver if, for example, the power of the signal exceeds a power threshold γ. For the purpose of this description, we use a conventional Shannon capacity formula to determine the following relationship between the threshold r:

$$\gamma = N_0 B(2^r - 1).$$

This implies the use of strong error correcting codes and a large number of bits in a single frame. Similar threshold formulas exist for MFSK and MQAM modulation constellations with or without error correction coding.

For the purpose of this description, we can represent the cooperative relay network 100 as an undirected graph G=(V, E), where E, the set of "edges" connecting the nodes, is the set of channels 105. A channel exists between nodes i and j if $H_{ij}(t)$ is greater than the predetermined power threshold γ.

A node can only decode transmissions from adjacent nodes. Let $N_h(i)$ denote the set nodes that can be reached in h-hops or less. That is, there exists a route of at most h hops from node i to every node in the set $N_h(i)$ in the graph G(V, E).

A class of transmission policies, denoted by P, is such that every strategy is a sequence of transmissions, where each transmission is of one of the following two modes: direct, broadcast, or cooperative beamforming.

Broadcast

A packet is broadcast from a single node i with power P(i, t). Multiple adjacent nodes in the set $N_h(i)$ may be able to decode the packet. As mentioned, a node k can successfully decode the packet if P(i, t)$H_{ik}(t) \geq \gamma$, the power threshold. Point-to-point transmission, in which only one node decodes the packet, is a special case of the broadcast mode.

Cooperative Beamforming:

In cooperative beamforming, multiple nodes phase-align and scale the power of their transmit signals so that the signals are all received coherently by a single receiving node j. At time t, the receiving node j can decode the packets transmitted coherently by the subset B of adjacent nodes that use beamforming if and only if $$(\Sigma_{i \in B} \sqrt{P(i,t) H_{ij}(t)})^2 \geq \gamma,$$

where P(i, t) is the transmit power of node i at time t. Subject to this threshold constraint, the total transmit power consumption is minimized when $$P(i, t) = \frac{H_{ij}(t) \hat{\gamma}}{(\Sigma_{k \in B} H_{kj}(t))^2}.$$

For this scheme to work, each node in the subset of adjacent nodes B must know the channel gain and phase of their channel to node j, and also the channel gain sum $$\Sigma_{k \in B} H_{kj}(t)$$

Cooperative Routing Constraints

Our aim is to minimize an average total cost in the network to transmit a packet from the source node to the destination node, via the set of intermediate cooperative relays, subject to the following two constraints Maximum Delay:

The packet is forwarded for a maximum of N frames, i.e., $N=|V|^4$ to bound the maximum in getting the packet to the destination.

Outage:

The probability that the destination does not decode the packet within N frame times after the source transmits the packet should not exceed $P_{out}$.

Cooperative Routing and Stochastic Network Control

A packet is generated at time $t_0$. The nodes that have successfully decode the packet sent by the source node at time t is the set R(t). Node i obtains the CSI, $f_i$: R(t), H(t), and the set R(t). Thus, $f_i: 2^{|V|} \times \Re|E| \mapsto X$. The range of the $f_i$'s is a general space, X, which is specified below.

Control and feedback information is required between nodes to obtain the desired CSI. This consumes energy. We assume that a feedback process exists for acquiring the CSI at node i. The feedback consumes an average energy given by $$E_{FB}(f_1, \ldots, f_{|V|}, H(t), R(t)).$$

We describe the basic properties of $P_i$ and the feedback $f_i$ and their interrelationship. Only nodes that decode the packet can forward the packet. For each node $i \in R(t)$, the transmission power is a function of the CSI available at the node.

Finding the optimal cooperative route is a stochastic control problem, where, in each use of the channel, the nodes that have a copy of the packet decide their transmission power value in a decentralized manner. Each node i obtains the CSI, $f_i(.)$, and the control input (policy) P(i, t). Henceforth, we interchangeably use transmit policy and cooperative route.

The aim of the stochastic control problem is to construct functions $f_i$ and $P_i$, for all nodes V, and to minimize the average energy consumption to send a packet from the source to the destination, subject to the above described delay and outage constraints. The optimization problem can be stated as:

$$\min_{\{P_i, f_i\}} \mathbb{E} \sum_{i=1}^{|V|} \sum_{t=1}^{N} (T_d P_i(f_i(\mathcal{R}(t), H(t)), t) + \varepsilon_{FB}(f_1, \ldots, f_{|V|}, H(t), \mathcal{R}(t))) \quad (1)$$

subject to $Pr(d \in R(N)) \geq (1-P_{out})$, and $P \in P$, (2)

where the dynamics of the set R(t) are given by $$\mathcal{R}(t+1) = \mathcal{R}(t) \cup \left\{ j \in \mathcal{L}(t) : \sum_{i \in N_1(j)} P_i(f_i(\mathcal{R}(t), H(t)), t) H_{ij}(t) \geq \gamma \right\}, \quad (3)$$

where R(0)={s} as no relay has decoded the packet at time $t_0$. The above formulation includes both the energy required for the transmission of the packet, and the transmission of the network control information. The set L(t) denotes the set of nodes that can possibly decode a packet at time t. For a broadcast, L(t) is the set of adjacent nodes of the broadcasting node. For beamforming, L(t) is the receiving node to which adjacent nodes transmit. Hence, a node not in the set R(t) is included in the set R(t+1) if the node successfully decodes the packet transmitted by adjacent nodes. The above problem is an infinite dimensional optimization problem.

We consider this optimization problem under two different scenarios corresponding to two different channel (and CSI) models.

Slow Fading (Quasi-Static) Channel

The channel coherence time of slow-fading (or quasi-static) channels is much greater than N. Such a scenario can arise, for example, in a static or limited mobility environments. Because the coherence time is much greater than N, a long duration of time is available for each node to obtain estimates of all channel gains. Hence, $f_i(R(t), H(t))=H(t)$. As the cost of obtaining CSI is spread over multiple frames, the per-frame cost is neglected, i.e., $E_{FB}=0$.

In the case of slow fading, the channel state varies very slowly, if at all, over a relatively long time. Consequently, the cooperative routing problem, given the channel state, is a deterministic one. Therefore, we set $P_{out}=0$, because "outage" in this case implies a service interruption for a long time. As $E_{FB}=0$ and $P_{out}=0$, the optimization problem in Equation (1) reduces to the following problem, which is to be solved every time the channel state changes:

$$\min_{\{P_i\}} \sum_{i=1}^{|V|} \sum_{t=1}^{N} P_i(H(t), t)$$

subject to $Pr(d \in R(N))=1$, and $P \in P$, (4)

where the dynamics of R(t) are given by Equation (3). Because each node eventually has access to the CSI on all channels in the network, the communication overhead of obtaining CSI can be neglected.

Fast Fading (Dynamic) Channel

In fast-fading channels, the channel gains H(t) change from one frame to another. We assume that H(t), t=0, . . . , N are independent and identically distributed (i.i.d). Because the channel state during each transmission is independent of the channel states of previous transmissions, it is not beneficial for a transmitting node to obtain the instantaneous CSI of channels more than two hops away (h≦2).

Cooperative Routing Schemes

As shown in FIG. 1B, we formulate a sequence of optimization problems that enable us to trade off complexity of route selection with performance. We piece together the optimal route 141 from a sequence of cooperative sub-routes 131 between pairs of nodes within h hops in the sub-graphs g(i, h).

The overall route from the source to the destination is then a sequence of these cooperative sub-routes, and the optimal (least) cost overall route 141 is determined 140.

In each sub-route, collaboration is allowed between nodes on the sub-route, and the optimal collaborative scheme is determined. However, there is no parallel (cooperative) transmission between different sub-routes. In other words, we decompose the optimization problem into two smaller optimization problems. The optimization for adjacent nodes is to find the best collaborative transmission policy. The optimization between the sub-routes is to find the best sequence of sub-routes that gets a packet from the source to the destination.

We now put this qualitative description into a more formal framework.

Super-graph $G_h$

Two nodes i and j in the super-graph $G_h=(V, E_h)$ are joined by an edge if there exists a route of at most h hops from node i to node j in the graph G.

Sub-graph g(i, h)

For each node, i, the sub-graph $G(i, h)=(V(i, h), E(i, h))$ includes nodes that can be reached by h-hops, and the edges that connect these nodes.

We now define a sub-class $P_h(i, j)$ of policies that get a packet from node i to node j, such that nodes that are not within h hops of node i do not participate in the forwarding.

Policy sub-class $P_h(i, j)$)

The subclass $P_h(i, j)$ is the set of policies for all P, such that nodes that are not within h hops of i do not transmit, and the message reaches j after a finite number of steps irrespective of which nodes (other than i) decoded the message before:

$$P(k, t)=0, t=1, \ldots, |V(i, h)|, \text{ and}$$

if $R(0)=\{i\}$, then $j \in R(|V(i, h)|)$, where the dynamics of R(.) are given in Equation (3).

Among all policies in which nodes not in the set V(i, h) do not transmit, the constraint, $j \in R(|V(i, h)|)$, only eliminates unnecessary transmissions that do not successfully deliver the packet to any node. Hence, this constraint does not compromise energy-efficiency.

Policy sub-class $T_h(v_1, \ldots, v_p))$

Consider a route, $(v_1, \ldots, v_p)$, from node $v_1$ to node $v_p$ in the super-graph $G_h$. The sub-class $T_h(v_1, \ldots, v_p)$ is the set of policies given by the Cartesian product $$T_h(v_1, \ldots, v_p) = P_h(v_1, v_2) \times \ldots \times P_h(v_{p-1}, v_p). \quad (5)$$

In other words, every policy in $T_h(v_1, \ldots, v_p)$ consists of a sequence of cooperative sub-routes (from policy sub-classes) from node $v_1$ to node $v_2$, and from node $v_2$ to node $V_3$, and so on. We now define a policy class $T_h$ that is the set of policy sub-classes over all routes in h.

Policy class $T_h$

Let $\Phi_h$ be the set of all routes in the super-graph $G_h$. The policy class $T_h$ is defined as $$T_h = \{T_h(v_1, \ldots, v_p) | (v_1, \ldots, v_p) \in \Phi_h\}. \quad (6)$$

Thus, the policy class $T_h$ includes cooperative routes, which have as their components smaller cooperative routes (sub-routes) each of which sends packets over a sequence of nodes that are each separated by at most h hops. We interpret h as the degree of cooperation allowed between nodes. Thus, when h is the diameter of the graph G, an optimal policy in $T_h$ is globally optimal. Also, from the above definitions, it follows that for $h_1 > h_2$, $T_{h2} \subseteq T_{h1}$. Hence, an optimal policy in $T_{h_1}$ consumes less than or equal to the energy consumed by an optimal policy in $T_{h_2}$.

We define the energy cost for transmitting a packet between two nodes connected by an edge in the super-graph $G_h$. This definition is useful in deriving distributed procedures to determine an optimal policy in $T_h$.

Edge cost $C_h(i, j)$)

The cost, $C_h(i, j)$ for an edge (i, j) in a sub-graph is the energy consumed in the network to transmit a packet from node i to node j using a minimal energy policy in the policy sub-class $P_h(i, j)$.

Figure 2:
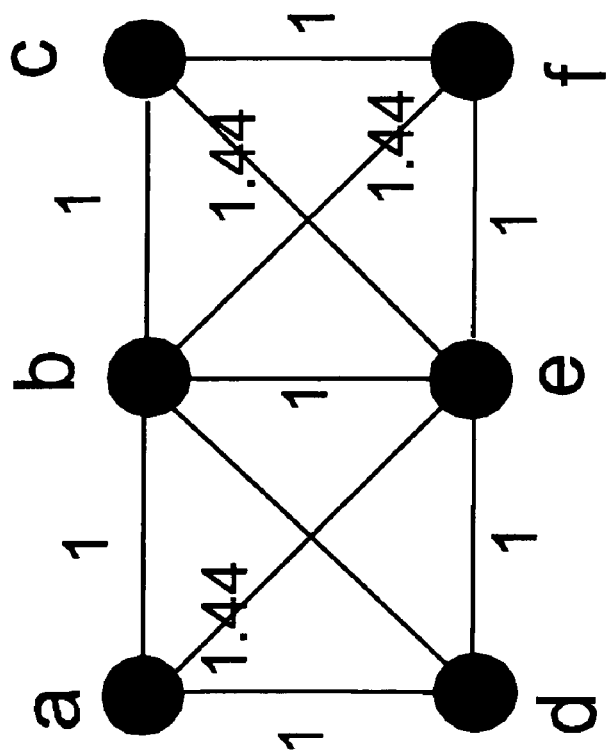
FIG. 2 is a graph representing a subset of nodes of the network of FIG. 1A with one hop costs according to an embodiment of the invention.

Consider an example relay network of nodes $\{a, \ldots, f\}$ 200 represented by the graph shown in FIG. 2, in which pairs of nodes that are at most $\sqrt{2}$ distance units apart are connected by an edge. The costs are indicated on the edges. In this network, the cost of sending a packet from node a to node e is a minimum if the packet is first broadcast from node a to adjacent nodes b and d, and then nodes b and d cooperatively to forward the packet to adjacent node f. This is due to the fact that the channel gain equals the route loss, which is proportional to the inverse fourth power of the distance from the transmitter. Therefore, to directly transmit the packet from node a to adjacent node e in one hop is more costly.

We construct the super-graphs $G_h$, and the corresponding edge costs as follows. The super-graph $G_h$ equals G for h=1, by definition. We now describe the computation of the channel costs for channels emanating from node a, i.e., $C_1(a, v)$, $v \in \{b, d, e\}$. Other channel costs, shown adjacent to the corresponding channels (edges) in FIG. 2, can be computed in a similar manner. Thus, the graph 200 shows the costs for nodes that are one hop away.

Next, we consider the sub-graph G(a, 1), which includes nodes a, b, d, and e, and edges (a, b), (a, d), (a, e), and (d, b). Then, the sub-class of policies $P_1(a, v)$ is the set of policies that get a packet from node a to node v using only nodes a, b, d.

The optimal policies in these classes and the corresponding energy consumption can be computed using a dynamic programming procedure or any other known means.

For packet transmission to node b, it turns out that the optimal policy is for a to transmit directly to b, which costs 1.0 units of energy. Similarly, direct transmission is optimal to get a packet to node d. For transmission to node e, it turns out that the optimal policy in $P_1(a, e)$ is one where node a first broadcasts to nodes b and d using 1.0 units of energy, and then nodes a, b, and d to node e. This consumes a total energy of 0.44 units.

Figure 3:
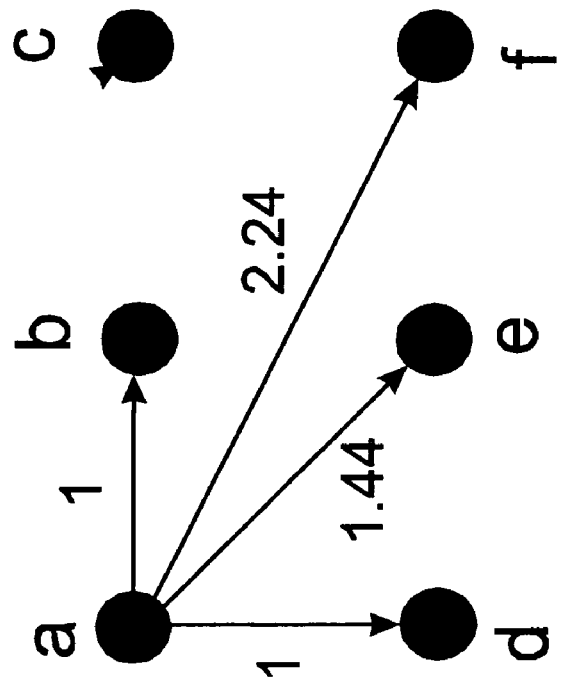
FIG. 3 is a graph representing a subset of nodes with two hop costs according to an embodiment of the invention.

FIG. 3 shows the sub-graph G(a, 2) 300 of the graph G. The class of policies $P_2(a, v)$ is the set of all policies in P that get the data from node a to node v. It turns out that energy optimal cooperative routes for node a to send a packet to nodes b, d, and e are the same as those in the sub-graph G(a, 1). Node a communicates with node c by first transmitting the packet to node b, which then forwards the packet to node c. For communication with node f, node a first broadcasts the packet to nodes b, d, and e. Then, nodes a, b, d, e beamform the packet to node f Improving Energy-Efficiency Using Node Reuse We now describe a refinement of the optimal scheme in class $T_h$. The refinement always reduces the cost to send a packet from the source to the destination. Such a refinement allows cooperation between different cooperative sub-routes.

The following theorem provides the theoretical underpinning for our approach. If node $v_l$ precedes node $v_m$ in the least cost path in the super-graph $G_h$, then node $v_m$ successfully decodes a packet only after node $v_l$ has decoded the packet.

Theorem: The least cost path in the super-graph $G_h$, between the source node, s, and the destination node, d, includes an ordered sequence of nodes, s, $v_1, \ldots, v_p$, d. For l<m, node $v_m$ successfully decodes the packet only after node $v_l$:

$$\min \{t: v_m \in R(t)\} > \min \{t: v_l \in R(t)\}, \quad (7)$$

Consider the cooperative route that forwards the packet along the route s, $v_1, \ldots, v_p$, d in $G_h$. Recall that the packet is forwarded from $v_{l-1}$ to $v_l$ using a policy in $P_h(v_{l-1}, v_l)$. In general, such a policy can forward the packet to intermediate nodes, say in the set $S(v_{l-1}, v_l)$, before the packet is decoded by node $v_l$. Therefore, the nodes that have decoded the packet can forward the packet from node $v_l$ to node $v_{l+1}$.

We now describe the above refinement by an example. The optimal policy in the class $T_1$ for sending packets from node a to node f includes of three steps. First, node a broadcasts a packet to nodes b and d. Then, nodes a, b, and d to transmit the packet to node e. Finally, node e forwards the packet to node f.

Figure 5:
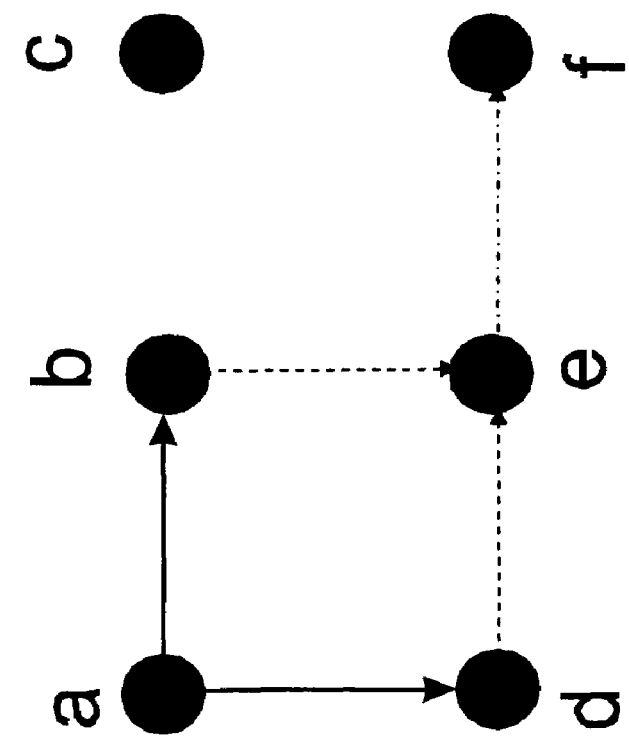
FIG. 5 is a graph of a refinement of the routing scheme of FIG. 4.
Figure 4:
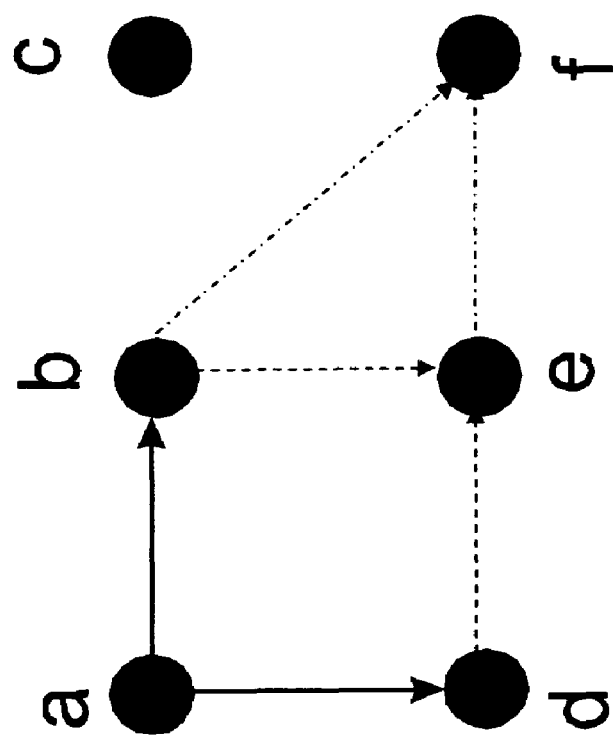
FIG. 4 is a graph of an optimal routing scheme according to an embodiment of the invention.

FIG. 4 shows the original scheme, and FIG. 5 shows the refined scheme. Using the node reuse refinement, node b, which is adjacent to node f has successfully decoded the packet when the packet was transmitted from node a to node e. Therefore, node b can simultaneously beamform with node e to forward the packet to node f. This reduces the total energy consumption from 2.44 units to 2.24 units on the second hop. In fact, the refined scheme in $T_1$ turns out to be actually the optimal scheme in $T_2$.

Fast Fading

With fast fading, the channel state change from one frame to the next, and outage no longer occurs in long bursts with a high probability. Hence, we can use interleaved codes between packets, or ARQ (automatic repeat request) strategies to allow a non-zero outage probability to reduce the cost. Thus, $0 < P_{out} < 1$. This special case of the cooperative route optimization problem reduces to an intractable Markov decision process (MDP).

Therefore, we describe a sub-class of policies for which a solution can be found. For this sub-class of policies, we describe a distributed computational procedure to compute the optimum policy. The optimal policy is determined only one time. Our computation gives a decentralized stochastic control policy, where the nodes in the network adapt the transmissions in real time, using a simple computation, as a function of the local CSI.

Markov Decision Process

For a given CSI, $\{f_i\}$, consider the decision process whose state space, S, is the $2^{|V|}$ different possible subsets of nodes that have decoded the packet up to time t, and whose action space, A(R(t)), is the set of transmission powers at the nodes at time t (P(i, t)) in the allowed class of transmissions $$A(R(t)) = \{P(i, t) \in R_+, i \in V: P(i, t) \in P, P(i, t) = 0 \text{ if } i \notin R(t)\}.$$

Optimal Policy

For the fast fading channel, the above MDP has a large state space of $2^n$ elements. Moreover, the state space is continuous because the transmission powers are real numbers. The large state spaces make the computation of an optimal policy intractable even for pre-specified CSI functions $f_i$'s, and corresponding feedback mechanisms, which defines appropriate $E_{FB}$s.

Data Transmission and CSI Acquisition Models

We consider policies that belong to a subset of $T_2$. For (i, j) $\in E_2$, the data transmission from node i to node j maintains an outage probability of $$P_{out}(2) = 1 - (1 - P_{out})^{1/n}.$$

This satisfies the constraint that the end-to-end outage probability does not exceed $P_{out}$. It is clarified herein that other criteria for determining $P_{out}(2)$ given $P_{out}$ can also be used. For example, $P_{out}(2)$ can be further optimized by doing a greedy bisection search. However, this issue is beyond the scope of this paper.

With a fast fading channel, the CSI available at the transmitting nodes, and the methods to acquire the CSI and the corresponding energy costs are integral to selecting the optimal route.

Therefore, we describe the different data transmission options and general models for CSI acquisition. In particular, for channel (i, j) $\in E_2$, for packet forwarding from node i to node j, we consider three kinds of transmission modes: direct transmission without CSI, direct transmission without CSI, and relays aided transmission. Other transmission modes are also possible, such as cooperative space-time codes.

Direct Transmission without CSI

If nodes i and j are connected by a single channel, then node i can directly transmit to node j. In this scheme, the transmitter has no knowledge of the instantaneous channel gain $H_{ij}(t)$. Thus, the transmitter adjusts its transmission power to satisfy the predetermined maximal outage probability of $P_{out}(2)$.

Direct Transmission with CSI

For (i, j) $\in$ E, node i obtains the CSI, $H_{ij}(t)$ to reduce the transmission power. If $H_{ij} \leq \delta_{ij}$, then node i transmits the packet to node j so that the received signal just exceeds the power threshold $$\gamma: P(i, t) = 1_{[H_{ij}(t) \geq \delta_{ij}]} \frac{\gamma}{H_{ij}(t)},$$

where $1_{[\cdot]}$ denotes the "Indicator" function. The threshold is chosen such that $H_{ij}(t)$ is above the threshold with probability $(1 - P_{out}(2))$.

Node i obtains the CSI by transmitting a training sequence at a fixed power $P_t$ for one symbol time to node j. Node j calculates and feeds back $H_{ij}(t)$, when, for example, the received signal power exceeds the power threshold. The feedback, if it occurs, uses c symbols, where c depends on the resolution of the feedback information. For this scheme, we have, $$f_i(H(t), R(t)) = [H_{ij}(t) 1_{[H_{ij}(t) \geq \delta_{ij}]}, 0, \ldots, 0],$$

$$\varepsilon_{FB}(f_1, \ldots, f_n, H(t), t) = 1 \times P_t + 1_{[H_{ij}(t) \geq \delta_{ij}]} \frac{c}{H_{ij}(t)},$$

No CSI is required at nodes other than i: $f_k(.) = [0, \ldots, 0]$, $k \neq i$.

Relay-Aided Transmission

Node i can transmit a packet to node j using a subset of adjacent nodes as relays. A combination of broadcast and beamforming is described below, which occurs over two successive frames, say frames at time t and (t+1). Specifically, node i (which has no CSI) broadcasts packets at a fixed power P(i, t). Adjacent nodes (including node j, if (i, j) $\in$ E) attempt to decode the packet. If node j cannot decode successfully, a subset of the common nodes of nodes i and j that successfully decode the data from node i, at time (t+1) to forward the packet to node j. An outage occurs if neither node j nor its common adjacent nodes decode the packet, or if the nodes which decode do not forward the packet to node j.

A general and feasible model for acquiring the required CSI and data transmission using beamforming is described below.

CSI Acquisition Model for Relay Aided Transmission

Figure 8:
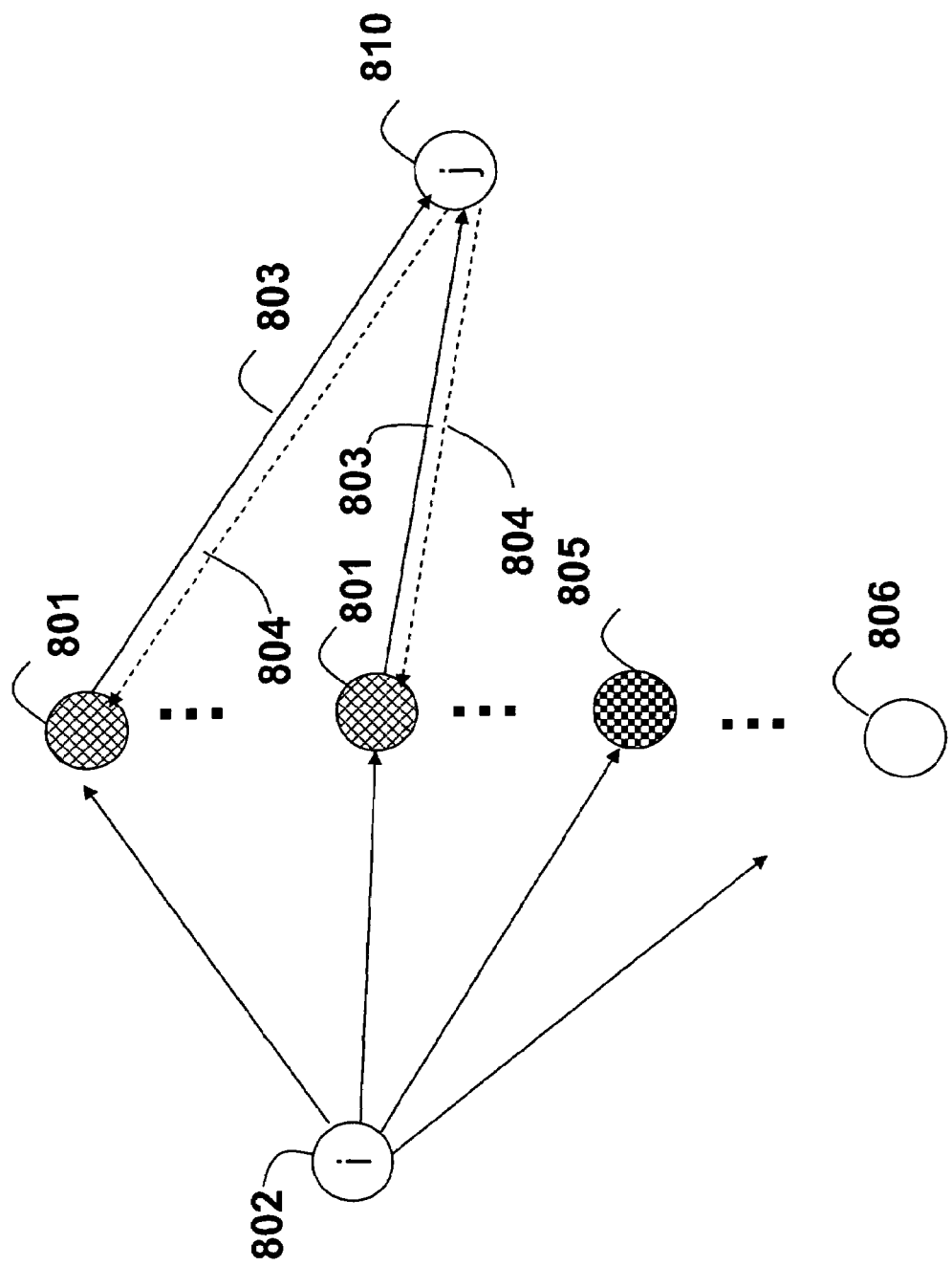
FIG. 8 is a graph representing a CSI acquisition model according to an embodiment of the invention.

FIG. 8 shows the CSI acquisition model according to an embodiment of the invention. Node 802 broadcasts a packet. Let $D(i, j) \in M_{ij}$ denote the set of relays 801 that successfully decoded the packet broadcast by node i 802 at time t. Nodes 801 are selected as relays, node 805 is not selected for beamforming, and node 806 is unable to decode the packet. The nodes 801 transmit 803 non-overlapping training sequences to node j 810 with power $P_t$ in the frame t+1. Each sequence has a duration of one symbol.

Then, with a probability p(D(i, j)), node j does not feed back any CSI to nodes in D(i, j), which do not transmit, e.g., node 805. Otherwise, as described above, node j feeds back 804 the following CSI to the subset K(D(i, j)) of relays with the highest instantaneous channel gains to node j 810:

(i) to relay v, the gain and phase of the channel $H_{vj}(t)$, and (ii) to all relays, the sum of el gains $\Sigma_{v \in K(D(i,j))}(H_{vj}(t))$.

This consumes energy $E_{FB}$. It is only the nodes 801 in the set K(D(i, j) that transmit to node j. With allowance for direct fading channel between nodes i and j, it is possible to determine an optimal relay-aided transmission scheme, i.e., the optimal P(i, t), p(D(i, j)), and K(D(i, j)), for all nodes i.

The broadcast mentioned above can be done without CSI at the node i or with CSI at the first node 802. The two options are similar except that in the latter case the node i first obtains the CSI over the links to all its adjacent nodes (using, for example, a training mechanism similar to the one described above). Doing so enables it to adjust its broadcast power so as to reach only a subset of all the relays. Furthermore, with this additional CSI, the node i can itself declare an outage if it finds, for example, that the channels to its adjacent nodes are all weak.

Distributed Routing

We only consider sequences of collaborative two-hop policies, i.e., we restrict collaboration to packet transmission between adjacent nodes in the graph G. Furthermore, we restrict the possibility for acquiring and using CSI to a finite set of policies, namely the policies described above. This makes the computation of an optimal policy, in the class of such policies, tractable.

We now formalize these concepts. We define a sub-class $\hat{T}_2 \subseteq T_2$ induced by the sets of policies $\hat{P}_2(i, j)$ in a manner identical to that for $T_2$. Using the CSI model described below, we can compute an optimal policy in $\hat{P}_2(i, j)$ and its energy cost to forward a packet from node i to node j.

Using arguments similar to those described above, an optimal policy in $\hat{T}_2$ is given by a least cost route computation on super-graph $G_2$. Thus, the overall computation of the costs and the optimal route in super-graph $G_2$ can be done in a distributed manner. The resulting optimal policy in $\hat{T}_2$ gives a stochastic control policy, which adapts the transmission powers at the nodes as a function of the CSI on local channels. The actual subset of relays that receive the broadcast and forward the packet depends on the instantaneous channel states, and varies with time in a stochastic manner.

Example of Stochastic Network Control

Figure 6:
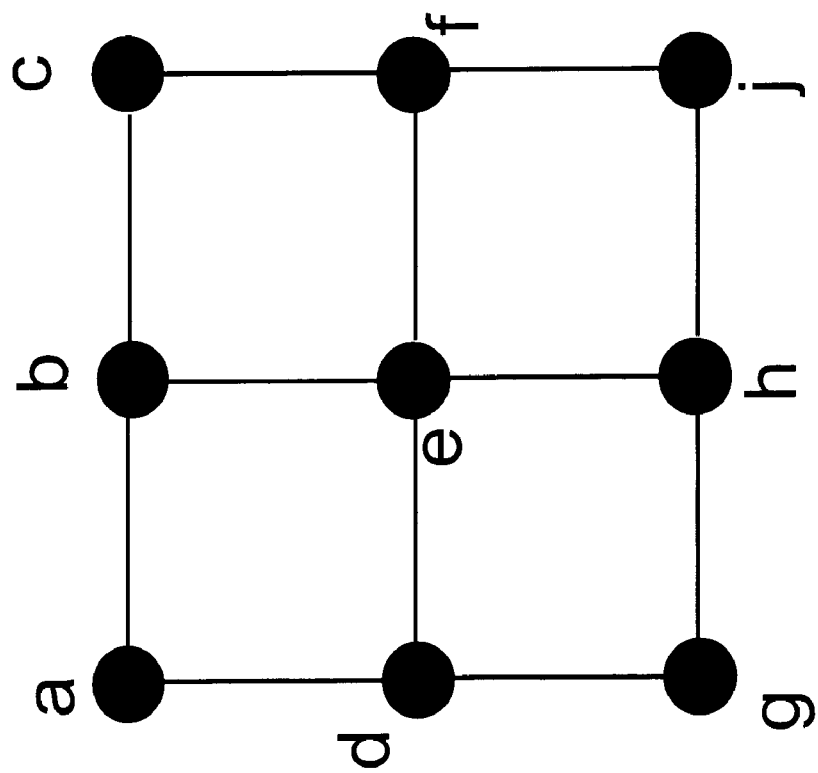
FIG. 6 is a graph of an example network with fast fading channels according to an embodiment of the invention.

FIG. 6 shows an example network with nodes {a, . . . , j} to describe the policies in $\hat{T}_2$ for fast fading channels. In a potentially suboptimal transmission policy, a packet is transmitted from node a to node j as follows. Node a uses nodes b, d as relays to transmit the packet to node e, which is two hops away from a. Node e uses the nodes f and h as relays to forward the packet to node j. This corresponds to routing where the first hop is data transmission from node a to node e, using a policy in $\hat{P}_2(a, e)$, while the second routing transmits from node e to node j (using a policy in $\hat{P}_2(a, e)$, The cost assigned to the edge (a, e) is the average energy consumption for a relay cooperation scheme used in the relay network formed by nodes a, e, b, and d.

Let us focus our attention on the transmission of the packet from node a to node e using nodes b and d as relays. Node a first broadcasts the packet to nodes b, d. We have the following three cases:

(i) Neither node b nor node d successfully decode the packet, which leads to outage.

(ii) Either node b or node d, but not both, decodes the packet. Let node b decode the packet. Then, as described in the below, node b acquires the CSI (the channel gain between nodes e and b) required to forward the packet to e.

(iii) Both nodes b and d decode the packet. Now, both acquire the CSI. Because, only two relays are present in the system, an optimal scheme always selects the node with the highest instantaneous channel gain to node e. Node e then feeds back the channel estimate to this single relay, which then forwards the packet to node e with just enough power to exceed the threshold γ, and to decode the packet.

The data transmission from node e to node j via nodes f and h follows similarly. Hence, data transmission from node a to node j is a sequence of alternating broadcasts and beamforming transmissions, with node e as an intermediate hop. The other two intermediate nodes (one each of {b, d} and {f, h }) participate depending on their channel states.

Figure 7:
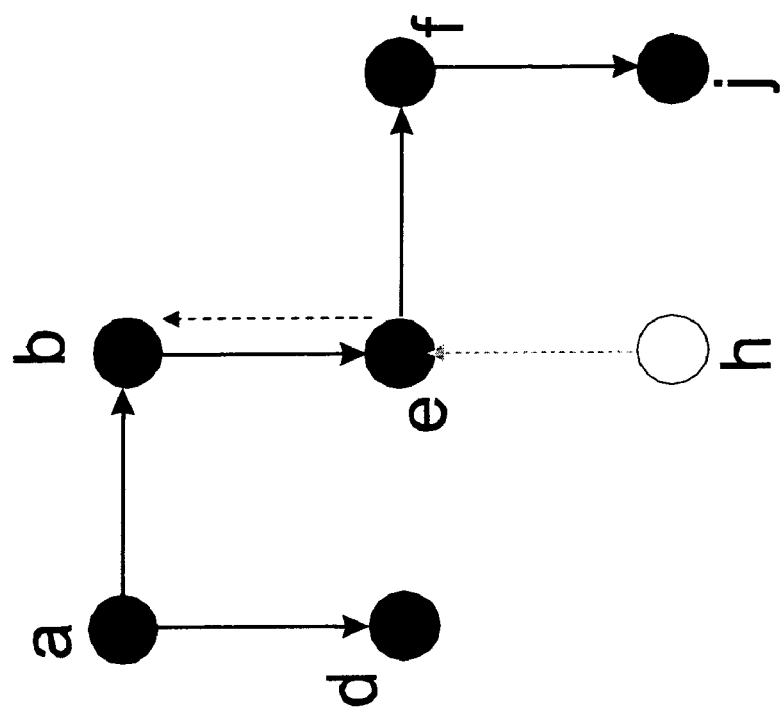
FIG. 7 is a graph of a sequence of transmissions for the example network of FIG. 6.

FIG. 7 shows the sequence of transmissions when the channel (b, e) has higher gain than the channel (d, e), and the channel (e, h) is in a deep fade. Node a broadcasts a packet, which nodes b, d decode. Node e feeds back CSI to node b, which then inverts the channel to forward the packet to node e (with small outage probability). Node e broadcasts, and only node f decodes. Node f acquires the CSI and inverts the channel (with small outage probability) to forward the packet to node j.

Effect of the Invention

The invention formulates decentralized routing in cooperative relay networks as a stochastic control problem. This framework allowed us to consider solutions for two significantly different variants of the problem that differ in their underlying channel models and the channel knowledge available within the network—quasi-static and dynamically fast-fading.

For both these models, we considered a class of transmission policies, which enable local cooperative communication via broadcasts and beamforming. The optimal route is selected using a graph representing the network induced by the local cooperative communication schemes.

For the quasi-static case, we provide a class of cooperative routes (policies), which trade-off complexity and degree of decentralization with energy-efficiency. For the fast fading case, we determine an optimal scheme in a sub-class in a decentralized and efficient manner.

A key to reducing the computational complexity is to decouple the design of the local cooperation scheme from routing over the induced graph. This approach works well, and with a high probability. It is assumed that a node cannot receive broadcasts from distant transmitters, nor can nodes transmit to a distant receiver. Also, the nodes use only locally available CSI to determine their transmission powers, which makes the network design scalable and decentralized.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting an optimal route in a cooperative relay network including a set of nodes, comprising a system for performing steps of the method, comprising the steps of:
    determining, at each node in the system, in a set of nodes of a cooperative relay network including at least one relay node, dynamically varying channel state information; and
    selecting, in the system dynamically a transmission policy based on the dynamically varying channel state information, in which the transmission policy includes selected nodes forming an optimal route, a transmission mode for each selected node, and a transmission power for each selected node, in which each node determines the dynamically varying channel state information for nodes that are within h hops of the node, where h is a number of the hops.

2. The method of claim 1, further comprising:
    transmitting a packet from a source node to a destination node of the cooperative relay network along the optimal route according to the selected transmission policy.

3. The method of claim 1, in which channels between the nodes are subject to time-varying fading.

4. The method of claim 1, in which the transmission modes include broadcasting and beamforming.

5. The method of claim 1, in which the optimal route is a least cost route, and the least cost is based on an amount of energy required to transmit a packet along the optimal route.

6. The method of claim 5, in which the amount of energy includes energy required to acquire the dynamically varying channel state information.

7. The method of claim 1, in which channels between the nodes are subject to fast fading and $h \leq 2$.

8. The method of claim 1, in which h depends on a channel coherence time.

9. The method of claim 1, further comprising:
    representing the set of nodes of the cooperative relay network by a graph, in which an edge in the graph represents a channel between two adjacent nodes;
    constructing a super-graph from the graph, in which an edge in the super-graph represents a virtual channel between two nodes are separated by at most h hops in the graph;
    constructing, for each node in the super-graph, a sub-graph of a subset of the nodes that are separated by at most h hops from the node and the edges that connect the nodes;
    determining for every unique pair of nodes in the sub-graph an optimal sub-route; and
    selecting the transmission policy based on the optimal sub-routes.

10. The method of claim 9, in which each optimal sub-route has a least cost, and the least cost is associated with the edges in the sub-graph.

11. The method of claim 10, in which the least cost is determined by dynamic programming.

12. The method of claim 11, in which the least cost is distributed to neighboring nodes in the super-graph.

13. The method of claim 10, in which the least cost includes a cost of transmitting a packet, a cost of receiving the packet, and a cost of acquiring the channel state information.

14. The method of claim 1, in which the transmission policy is determined in a decentralized manner by the set of nodes.

15. The method of claim 1, further comprising:
    distributing the dynamically varying channel state information among the set of nodes.

16. A method for selecting an optimal route in a cooperative relay network including a set of nodes, comprising the steps of:
    representing a set of nodes of a cooperative relay network by a graph, in which an edge in the graph represents a channel between two adjacent nodes;
    constructing a super-graph from the graph, in which an edge in the super-graph represents a virtual channel between two nodes are separated by at most h hops in the graph;
    constructing, for each node in the super-graph, a sub-graph of a subset of the nodes that are separated by at most h hops from the node and the edges that connect the nodes;
    determining for every unique pair of nodes in the sub-graph an optimal sub-route; and
    selecting the optimal route based on the optimal sub-routes.

17. The method of claim 16, in which each optimal sub-route has a least cost, and the least cost is associated with the edges in the sub-graph.

18. The method of claim 16, in which the channel between the nodes are subject to fast fading.

* * * * *